United States Patent [19]

Innes et al.

[11] Patent Number: 4,860,554

[45] Date of Patent: Aug. 29, 1989

[54] COUNTER-FLOW POULTRY CHILLER

[76] Inventors: Robert S. Innes, 92 Queensdale Avenue East, Ontario, Canada, L9A 1K3; Bernard McGuire, 211 Cochran Road, Ontario, Canada, L8K 3G5

[21] Appl. No.: 246,078

[22] Filed: Sep. 19, 1988

[51] Int. Cl.$^4$ ............................................. F25D 17/02
[52] U.S. Cl. ......................................... 62/374; 62/380
[58] Field of Search .................. 62/63, 64, 374, 375, 62/380

[56] References Cited

U.S. PATENT DOCUMENTS

| | | | |
|---|---|---|---|
| 3,022,646 | 2/1962 | Zebarth | 62/374 |
| 3,097,501 | 7/1973 | Pappas | 62/64 |
| 3,240,026 | 3/1966 | Van Dolan et al. | 62/374 |
| 3,250,086 | 5/1966 | Morris, Jr. | 62/64 |
| 3,368,363 | 2/1968 | Alaburda | 62/374 |
| 3,407,872 | 10/1968 | Crane | 62/64 |
| 3,447,337 | 6/1969 | Skruch et al. | 62/374 |
| 3,498,208 | 3/1970 | Longe et al. | 62/64 |
| 3,587,241 | 6/1971 | Haren | 62/374 |
| 3,595,672 | 7/1971 | Bajcar et al. | 62/64 |
| 3,623,331 | 11/1971 | Buyens | 62/64 |

Primary Examiner—Ronald C. Capossela
Attorney, Agent, or Firm—McConnell and Fox

[57] ABSTRACT

A counter-flow food chiller provided with an oscillating screw-feed so that the food, while being pushed through the chill tank in a direction contrary to the water flow is also agitated and oscillated, improving the heat exchange and preventing ice formation on the walls of the tank which are cooled by refrigeration.

8 Claims, 2 Drawing Sheets

COUNTER-FLOW POULTRY CHILLER

FIELD OF THE INVENTION

This invention relates to chillers for cooling poultry carcasses during processing and, in particular, to a continuous counter-flow chiller with refrigeration facilities built into the tank containing the poultry to be chilled.

DESCRIPTION OF THE PRIOR ART

Various methods have been used in the past to chill poultry during the processing. It will be understood that poultry, once eviscerated under current regulations, must be chilled as promptly as possible to an internal temperature of 4° C. or lower. Very cold water is usually used as a practical medium for chilling poultry carcasses. When water is used, a surplus of water should be used to ensure that a flow of water will occur. The flow of water should ensure the removal of extraneous materials in such a manner as to have the carcasses as clean as possible when they leave the chilling system.

The rate of heat transfer is specific for each medium containing heat. The rate of transfer of poultry meat freshly killed and placed in conventional chill systems to drop the temperature from normal body heat to 4° C. is of the order of one hour per inch thickness of meat measuring from the deep meat point to the outer surface. This rate can be modified only by changing the difference in temperature between the product to be chilled and its surrounding medium.

Hence, in all chill systems, the movement of the carcasses through the tank must be slow enough to provide adequate time for heat to transfer out of the deep meat of the carcasses. The time required to remove the body heat can only be improved by reducing the temperature of the medium surrounding the carcasses.

In still water, the layer of the medium next to the carcass tends to remain about the carcass. This layer heats up and then acts as insulation to outer colder layers of the medium, tending to prevent it from also absorbing body heat. Agitation, mixing up the layers eliminates the insulating action, reducing the required time to chill the carcasses. Lack of agitation is sometimes countered by introducing compressed air at the bottom of the tank but, the introduction of air only causes a very small and insufficient amount of agitation. Insufficient agitation has made it impractical to use built-in refrigeration coils in air agitated tanks.

One of the common methods used to chill poultry carcasses is to move the eviscerated birds down the length of the tank of chilled water by means of direct water flow with a series of paddles set into the length of the tank and moving at right angles to the water flow. Birds and water are introduced at one end of the tank, and the birds are moved by means of the water flow and paddle action, to the other end of the tank while, at the same time, the water is maintained in a chilled condition by means of refrigeration coil panels which are constructed so that one plate of the coil panel forms the inner surface of the tank. The continual flow of carcasses being scraped along the tank wall, the tumbling of the carcasses against the wall by the rotation of the paddles, and the agitation of the water caused by the movement of the paddles, prevents ice from forming on the tank walls even though the chilling coils are operating below the freezing temperature of the water in the tank. In this process, the fresh water and chilled water are introduced at the input end of the tank, flow the length of the tank and exit at the carcass discharge end of the tank. The carcasses at the output end are in contact with the most contaminated water in the chill system.

Another arrangement has been proposed in the past, where the carcasses are moved along a tank by means of a screw or a drag type chain conveyor. Chilled water is introduced into the output end of the tank proceeding in reverse direction to that of the carcasses. This is referred to as a counter-flow chiller. One problem encountered with this construction, is that the movement of the poultry by a screw or a drag type conveyor operating in a tank must be sufficiently slow to permit dwell time of poultry in the tank to reduce the body temperature as required, all within a reasonable tank length. The movement in the tank, therefore, is not sufficient to create agitation of the medium to prevent formation of ice on the tank walls if refrigeration coils are built into the tank walls. Hence, built-in refrigeration coils cannot be used in such counter-flow tanks, and an excessively large volume of prechilled water must necessarily be suppled to provide all chilling of the carcasses, water and tank. Further, the agitation is so minimal that the birds being chilled in existing counter-flow chillers virtually move slowly through still water.

In all existing counter-flow systems, it is necessary to have a large external refrigerated tank with sufficient capacity not only to supply make-up water to chill birds, but to initially fill chill system with refrigerated water, a large expense both financial and spacewise.

To chill poultry most efficiently, it would be preferrable to use water as a chilling medium, contained in a tank, with refrigeration coils built in to the walls of the tank, and with a surplus of water being added to the tank at the end of the tank where the chilled poultry is exited and the overflow of water occurring at the end where the unchilled poultry is received into the tank, all with adequate agitation, mechanical movement of the produce through the tank and positive control over dwell time of the product in the tank.

It would also be desirable to have chilling coils built into the walls of the tank without causing ice on the inner surface of the tank and without the necessity of introducing turbulence in the tank by introduction of air.

SUMMARY OF THE INVENTION

In accordance with the present invention, the carcasses are discharged from the evisceration line into a chill tank having external refrigeration coils. They are fed forward through the chill tank by a screw which not only forces the carcasses forward through the tank but also, by means of paddles fixed to the screw, causes the carcasses to be tumbled and creates agitation in the media adjacent to the wall of the tank, where refrigeration coils are built-in. In order to maintain sufficient action, tumbling of the carcasses and scrubbing of the surfaces of the tank, yet retain the carcasses in the chilling water long enough to remove the body heat, the auger or screw, complete with the built-in paddles, rotates both forward and backwards in such a manner that the carcasses and water are agitated in the tank, and the tank walls are scrubbed by the activity and proximity of the worm to the wall of the tank, and also by the carcasses being forced forward and backward by the screw action and up and down by the paddles. The action of the worm with its paddles causes scrubbing of the internal surfaces of the tank and minimizes the ice formation which would otherwise be caused by the refrigeration coils built into the wall of the tank. The agitation also recirculates any water which might otherwise be trapped within the cavities of the carcasses which water would be warmed up if held still within the cavity, and replaces the warmed water in the cavity with cold water. Thus, the agitation system causes a thorough mixing of the chill water, maximum exposure of the chill water to the cooled surface of the tank and maximum exposure of all surfaces of the carcasses to chilled water. The net rate of travel of the carcasses through the tank is relatively slow, by virtue of the reversing of rotation of the auger. Revolutions are indexed so that reverse revolutions are less than the forward revolutions and a net forward action occurs at a rate appropriate to retaining the carcasses in the chill system long enough to extract the body heat necessary to reduce the internal meat temperature to 4° C. or less. This minimizes the length of the tank and yet provides the agitation necessary in the tank. By selecting the degree of forward motion versus the degree of reverse motion, the screw can turn enough to cause agitation and yet the progress of the carcasses is relatively slow.

A clearer understanding of our invention may be had from a consideration of the drawings in which:

DESCRIPTION OF THE PREFERRED EMBODIMENT

Figure 1:
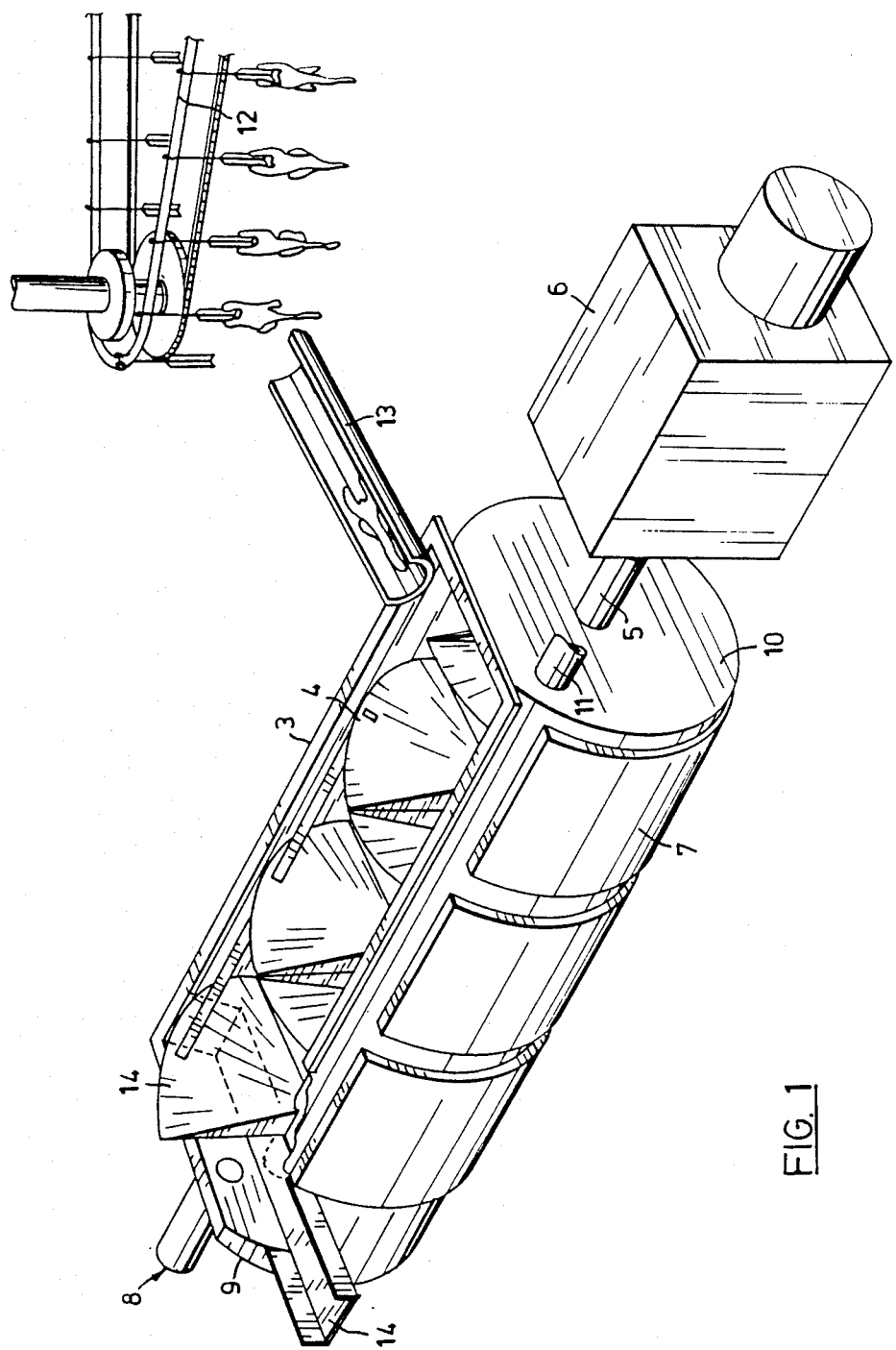
FIG. 1 is an isometric view of the chiller in accordance with our invention.

As will be seen from FIG. 1, the chiller consists of a tank 3 of substantially semi-cylindrical form of a size sufficient to contain the desired quantity of carcasses and water and which includes in its interior a worm 4 mounted on a shaft 5. The shaft 5 passes through a suitable seal in the end of the tank and is connected to and driven by a reciprocating drive 6. The worm 4 is dimensioned so as to closely approach the surface of tank 3 which may be semicylindrical and extend 270° or more around the worm. Refrigeration coils 7 are mounted on the exterior of the tank 3, or form an integral part of that tank 3, and a suitable water inlet provided at 8 at the output end 9 of the chiller. A water overflow is provided at the input end 10 and is designated 11. An evisceration line 12 supplies carcasses to the chiller by discharging them into a chute 13 which drops directly into the chiller tank 3. A discharge mechanism 14 at the output end removes the carcasses from the chiller and discharges them for further processing.

Figure 2A:
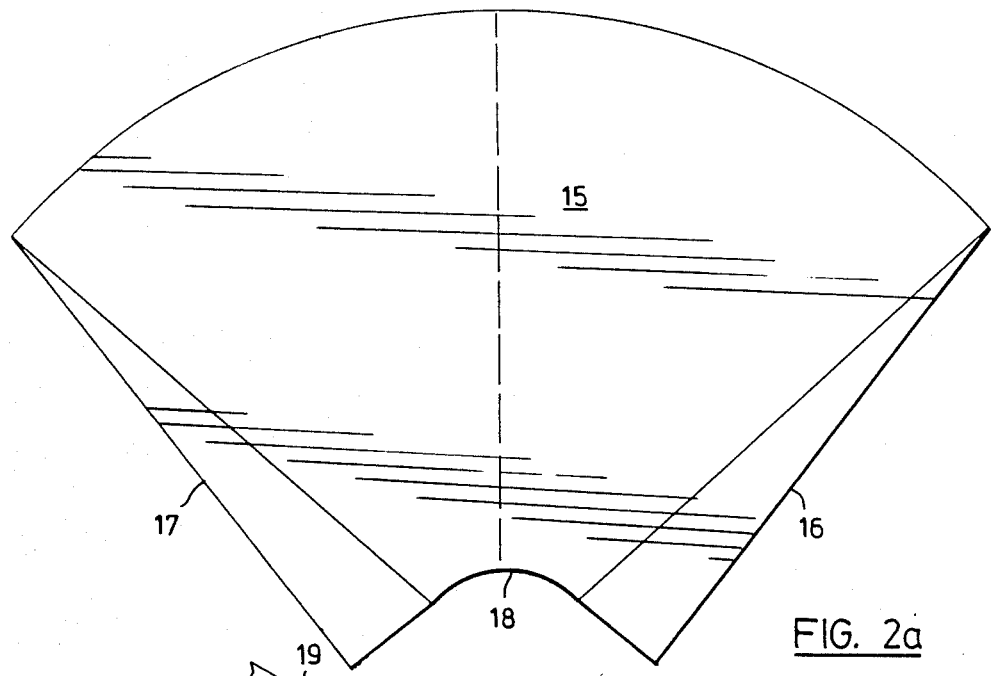
FIG. 2A is a detail of a portion of the worm of FIG. 2.
Figure 2:
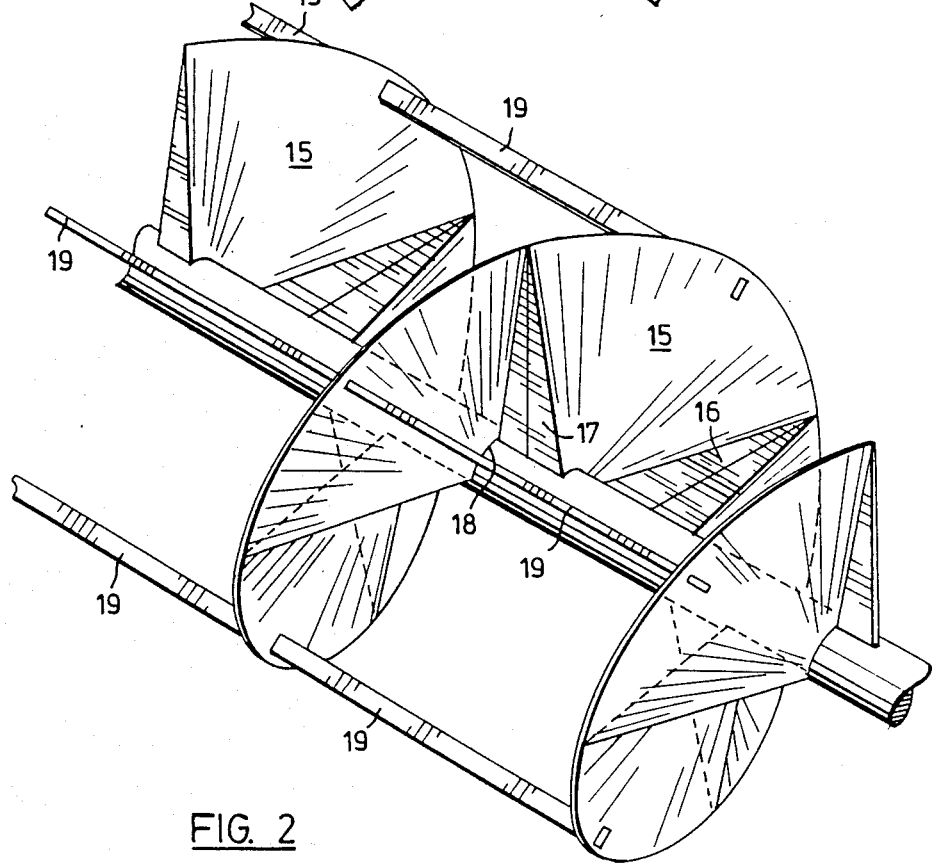
FIG. 2 is a detailed portion of the worm of the chiller in FIG. 1.

As will be seen in FIG. 2, the worm is most conveniently fabricated from a plurality of segments 15, each segment being formed, as shown in FIG. 2A, or in a similar fashion, and welded along its edges 16 and 17 to the adjacent segment and along its edge 18 to the shaft 5. The triangular sections at the edges of the segment which terminate in edges 16 and 17 form steps and, as the worm turns, cause turbulence and tumbling of the carcasses. In addition, paddles 19 joining the segments of the worm, support the segments and also serve to promote further tumbling action and also scrubbing action as they closely approach walls of the tank 3 during rotation. This proximity causes turbulence at the surface and minimizes the possibility of ice formation not only because the paddles are close to the tank wall, but also because the carcasses are dragged along the surface of the tank wall, scrubbing the tank wall.

OPERATION

During operation, carcasses from the evisceration line 12 are discharged into chute 13 and dropped directly into tank 3. The worm 4 picks up the carcasses and tumbles them about by the action of the paddles and the steps in the worm. Water from inlet 8, which may be prechilled, is introduced adjacent the output end of the tank tending to chill the carcasses at that end and is further cooled by the refrigeration coils 7, to ensure that the output temperature of the carcasses is sufficiently low. The reciprocating motion of the worm causes churning and tumbling of the carcasses and scrubbing of the tank walls, as previously indicated, to minimize the production of ice at the surface of the refrigerated walls. At the same time, because the average motion of the worm is such as to cause the carcasses to proceed down the tank from the evisceration line to the discharge end, the net motion of the carcasses is towards the discharge. After tumbling and chilling in the cold water, the carcasses are discharged into the discharge chute 14.

It will be seen that reversing drive 6 will determine the length of stay of the carcass in the tank and also the degree of agitation. By selecting a suitable rate of rotation, the carcasses can be agitated in the tank ensuring complete chilling and minimizing the likelihood of ice forming on the tank surfaces and, at the same time, the ratio of forward motion to backward motion can be adjusted to ensure that the dwell time in the tank is optimized to produce sufficient chilling of the carcass and, at the same time, not overly delay the carcasses in the chill. By suitable selection of the rate of rotation of the screw and the proportion of forward and backward motion, all the variables can be adjusted to produce the desired output temperature of the carcasses and desired dwell time, with a given rate of input and a given water flow.

While no details are provided with respect to the reversing drive, it will be evident that various forms of reverse drives could be applied to produce an adjustable rate of flow suitable to the purpose.

While described as a poultry chiller, it will be understood that the chiller may have application to processing of other products, such as hams, which require similar processing.

It will be apparent that the dimensions of the tank, the rate of water flow, and the volume of produce passed through the system per minute will all be interrelated and will depend on the product being processed but may be readily determined by a skilled user.

We claim:

1. A food product chiller comprising a tank of cylindrical form mounted with its axis substantially horizontal and having an opening extending axially along its upper side, said tank being closed at each end, means to supply a flow of food product through said opening at a first end of said tank and means to remove food product from the second end of said tank, means to supply a flow of water into said second end of said tank and means to remove water from said first end of said tank, a screw-feed mechanism mounted within said tank with its axis coaxial with axis of said tank and its outer edges closely approaching the inner surface of said tank, means to rotate said screw-feed on its axis with an intermittently reversing rotary motion with a net rotary motion such as to feed said food product from said first end of said tank to said second end of said tank, while simultaneously agitating and oscillating said food product and said water.

2. A food product chiller as claimed in claim 1 wherein cooling means are thermally connected to the outer surface of said tank.

3. A food product chiller as claimed in claim 2 wherein said cooling means comprises refrigeration coils operating at a temperature below 0° C.

4. A food product chiller as claimed in claim 1 wherein said screw-feed comprises an augur with paddle members joining adjacent turns of said augur near the outer periphery of said auger.

5. A food product chiller as claimed in claim 1 wherein said screw-feed comprises a plurality of sections of arcuate form each section joined to the adjacent section by a step and producing an augur whose outer periphery is a smooth spiral but whose intermediate portion is a discontinuous surface including a plurality of steps.

6. A food product chiller comprising a tank of circular cross-section closed at each end and open along its upper surface, means to supply a flow of food product to one end of said tank through its open upper surface, means to remove said flow of food product from the other end of said tank through its open upper surface, an augur in said tank mounted on a shaft coaxial with said tank with the outer edges of said augur closely adjacent the inner surface of said tank, a plurality of paddles joining adjacent turns of said augur near the periphery of said augur and means to drive said shaft with an oscillating, rotational motion whereby said food product is oscillated and also gradually moved from said one end of said tank to said other end of said tank and means to supply a flow of water to said other end of said tank and remove an equal flow of water from said one end of said tank.

7. A food product chiller as claimed in claim 6 including refrigeration means in thermal contact with the outer surface of said tank.

8. A food product chiller as claimed in claim 7 wherein the net rotational motion applied to said shaft is such as to cause said food product to move from said one end to said other end of said tank in a time sufficient to produce a temperature drop in said food product sufficient to satisfy production requirements.

* * * * *